F. A. BOWDLE.
INSULATOR BRACKET.
APPLICATION FILED FEB. 18, 1913.
1,139,950.
Patented May 18, 1915.
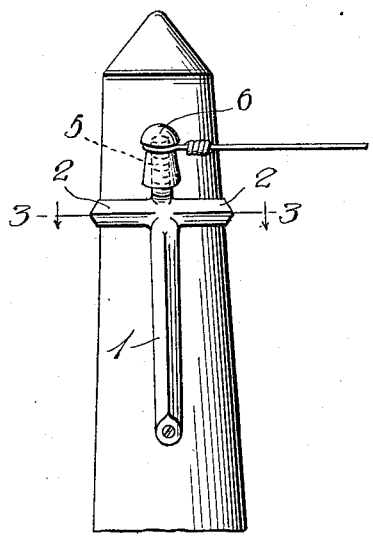
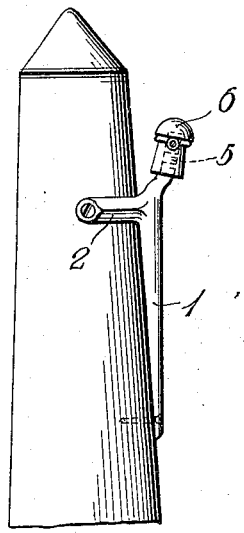
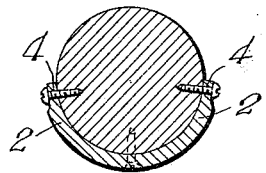
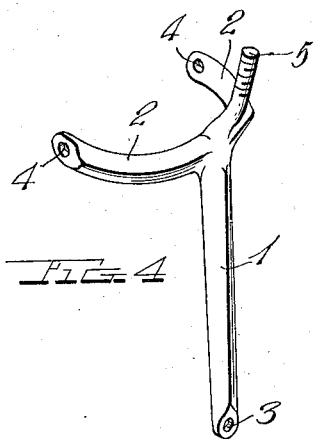
Inventor
Frank A. Bowdle
Witnesses

UNITED STATES PATENT OFFICE.

FRANK A. BOWDLE, OF CERRO GORDO, ILLINOIS.

INSULATOR-BRACKET.

1,139,950.  Specification of Letters Patent.  Patented May 18, 1915.

Application filed February 18, 1913. Serial No. 749,127.

*To all whom it may concern:*

Be it known that I, FRANK A. BOWDLE, a citizen of the United States, residing at Cerro Gordo, in the county of Piatt and State of Illinois, have invented certain new and useful Improvements in Insulator-Brackets; and I do declare the following to be a full, clear, and exact description of the invention, such as will enable others skilled in the art to which it appertains to make and use the same.

This invention relates to improvements in insulator brackets.

One object of the invention is to provide an insulator bracket having an improved construction and arrangement of attaching members by means of which the bracket when secured to a pole or other object will effectually resist all strain applied thereto through the wire connected therewith and which is particularly adapted for use as a "dead ending bracket", but may be employed in any capacity or in any position where an ordinary insulator bracket is used.

Another object is to provide a bracket of this character which will be simple in construction and may be produced at very little if any greater cost than other insulator brackets now in use, and which are unreliable.

With these and other objects in view, the invention consists of certain novel features of construction, and the combination and arrangement of parts as will be more fully described and claimed.

In the accompanying drawings: Figure 1 is a front view of the upper end of a pole showing my improved bracket secured thereto; Fig. 2 is a side view of the parts shown in Fig. 1; Fig. 3 is a horizontal sectional view of the bracket taken on the line 3—3 of Fig. 1; Fig. 4 is a perspective view of the bracket.

My improved bracket comprises a main bar 1 having on its upper end, right angularly projecting bracing arms 2 which may be of any suitable shape to fit or engage the object to which the bracket is to be attached and which in the present instance are shown as being curved or of segmental form to engage the sides of a telegraph pole or similar object. The main bar or shank 1 and the arms may be of any suitable cross sectional shape and are preferably triangular as shown. The bar or shank 1 also preferably gradually decreases in thickness toward its outer end and has its outer end flattened and provided with an aperture 3 to receive a nail, lag-screw or other fastening device. The ends of the arms 2 are also preferably flattened and have formed therein apertures 4 adapted to receive suitable fastening devices which are inserted therethrough and together with the fastening devices inserted through the aperture 3 in the bar 1 are driven into the pole or other support to which the bracket is attached as shown.

On the upper end of the bracket and at the inner end of the bar or body 1 is formed a threaded finger 5 which is adapted to receive the insulator 6 which may be of the usual or any preferred construction. The finger 5 is slightly offset or deflected and projects at an oblique angle from the upper end of the bracket and thus spaces the insulator from the pole or object to which the bracket is attached and holds the insulator in position to receive the wire which may be readily secured thereto in the usual or any suitable manner.

By providing the bracket 1 with curved object engaging arms 2 apertured at their ends it will be seen that the bracket will effectually resist any strain which may be applied thereto by the wire connected therewith and it will be practically impossible to pull the bracket from its pole or support. By reason of its peculiar construction and its capacity for resisting great strains the bracket is particularly adapted for holding dead ended wires which are subjected to great strain which is applied directly to the bracket. Because of the great strain applied to the dead ended wire it has been extremely difficult to obtain a bracket or to fasten the same firmly enough to support such a wire or to receive the strain applied thereto. Practical trials, however, have demonstrated that my improved bracket as herein shown and described will effectually resist any strains which may be applied thereto by a dead ended wire or any other strain to which the same may be subjected in supporting telephone, telegraph or electric light circuit wires or cables.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

An insulator bracket comprising a semi-circular arm for engagement with a support, the ends of said arm having apertures therein whereby to secure the same to the support, a depending shank formed integral with said arm midway of its ends, the inner face of said shank being arcuate in transverse section and tapered in thickness toward its lower outer end to conform to the outline of a support to be engaged thereby, the extreme lower end of said shank being also provided with an aperture whereby to secure the same to the support and a threaded insulator finger also formed integral with said semi-circular arm intermediate of its ends, said finger alining with the shank to form substantially a continuation of the latter and bent outwardly and upwardly with respect to the arm to facilitate the application to and removal of an insulator thereon.

In testimony whereof I have hereunto set my hand in presence of two subscribing witnesses.

FRANK A. BOWDLE.

Witnesses:
 HOMER ELLIS,
 E. J. WAGONER.

Copies of this patent may be obtained for five cents each, by addressing the "Commissioner of Patents, Washington, D. C."